United States Patent
Savagaonkar et al.

(10) Patent No.: US 7,587,612 B2
(45) Date of Patent: Sep. 8, 2009

(54) GENERATING AND COMMUNICATING INFORMATION ON LOCATIONS OF PROGRAM SECTIONS IN MEMORY

(75) Inventors: Uday Savagaonkar, Beaverton, OR (US); Travis Schluessler, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 828 days.

(21) Appl. No.: 11/173,587

(22) Filed: Jun. 30, 2005

(65) Prior Publication Data

US 2007/0006137 A1    Jan. 4, 2007

(51) Int. Cl.
    G06F 11/30    (2006.01)
(52) U.S. Cl. .................. 713/187; 713/188; 713/189
(58) Field of Classification Search ............... 713/187, 713/188, 189
    See application file for complete search history.

(56) References Cited

OTHER PUBLICATIONS

Hiding Your Wares: Transparently Retrofitting Memory Confidentiality into Legacy Applications Levy, J.; Khan, B.; Communications, 2007. ICC '07. IEEE International Conference on Jun. 24-28, 2007 pp. 1368-1372.*
CryptoPage: An Efficient Secure Architecture with Memory Encryption, Integrity and Information Leakage Protection Duc, G.; Keryell, R.; Computer Security Applications Conference, 2006. ACSAC '06. 22nd Annual Dec. 2006 pp. 483-492.*
Improving Cost, Performance, and Security of Memory Encryption and Authentication Chenyu Yan; Rogers, B.; Englender, D.; Solihin, D.; Prvulovic, M.; Computer Architecture, 2006. ISCA '06. 33rd International Symposium on 0-0 0 pp. 179-190.*
Apple Computer, Inc., "Mac OS X ABI Mach-o File Format Reference", Mar. 8, 2006, pp. 1-61.
Microsoft Corporation, "Microsoft Portable Executable and Common Object File Format Specification", Revision 6.0, Feb. 1999, pp.
Red Hat, Inc., "Red Hat Enterprise Linux 4: Using as, the Gnu Assembler", © 2004, pp. 1-288.
Tools Interface Standards (TIS), "Executable and Linkable Format (ELF)", *Portable Formats Specification* Version 1.1.
U.S. Appl. No. 11/171,859, filed Jun. 30, 2005, entitled "Agent Presence Monitor Configured to Execute in a Secure Environment", invented by R. Sahita, T. Schluessler, & S. Hahn.

(Continued)

*Primary Examiner*—David Y Jung
(74) *Attorney, Agent, or Firm*—Konrad Raynes & Victor LLP; David W. Victor

(57) ABSTRACT

Provided is a method, system, and program for generating and communicating information on locations of program sections in memory. Source code is generated for an agent program. The source code includes start and end variables for selected sections of the program, wherein the start and end variables for each selected section are used to indicate the start and end address in a memory at which the section is loaded. The selected sections are capable of including less than all the sections in the program. The source code is compiled and linked to generate an object file including the sections. The object file causes, in response to being loaded into the memory of a computer, a relocation of at least one of the start and end memory addresses of the selected sections into at least one of the start and end variables for the selected sections when memory addresses are assigned to sections as part of relocation operations. Other embodiments are disclosed and claimed.

25 Claims, 7 Drawing Sheets

OTHER PUBLICATIONS

U.S. Appl. No. 11/173,851, filed Jun. 30, 2005, entitled "Systems, Apparatuses, and Methods for a Host Software Presence Check from an Isolated Partition", invented by S.D. Hahn, T. Schluessler, C.W. Smith, R.L. Sahita, & H.C. Herbert.

U.S. Appl. No. 11/174,315, filed Jun. 30, 2005, entitled "Signed Manifest for Run-Time Verification of Software Program Identity and Integrity", invented by T. Schluessler, D. Durham, G. Cox, & K. Grewal.

* cited by examiner

Section Start and End Array Entry

GENERATING AND COMMUNICATING INFORMATION ON LOCATIONS OF PROGRAM SECTIONS IN MEMORY

BACKGROUND

Certain computer system components may want to monitor code loaded into a runtime environment. For instance, certain programs may monitor the integrity of agent code in the host memory to check whether the agent code has been compromised by malicious code, such as viruses, worms, etc. Monitored agent code may comprise an anti-virus program, whose integrity is essential to protect the system. Further, viruses and worms are capable of breaching the kernel boundary and tampering with critical kernel components that are responsible for monitoring the security of the system. To perform the operations to monitor and check the agent code, the program or virtual partition performing the monitoring operations determines the location of the code in the memory to check whether unauthorized and possibly malicious changes have been made to the code since being loaded into memory. In certain systems, the code may be loaded into fixed locations in the memory which the monitoring program or partition uses to access the code to determine if there have been unauthorized changes. Alternatively, the monitoring program or partition may search page-by-page through the memory to locate the agent code to monitor and check.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
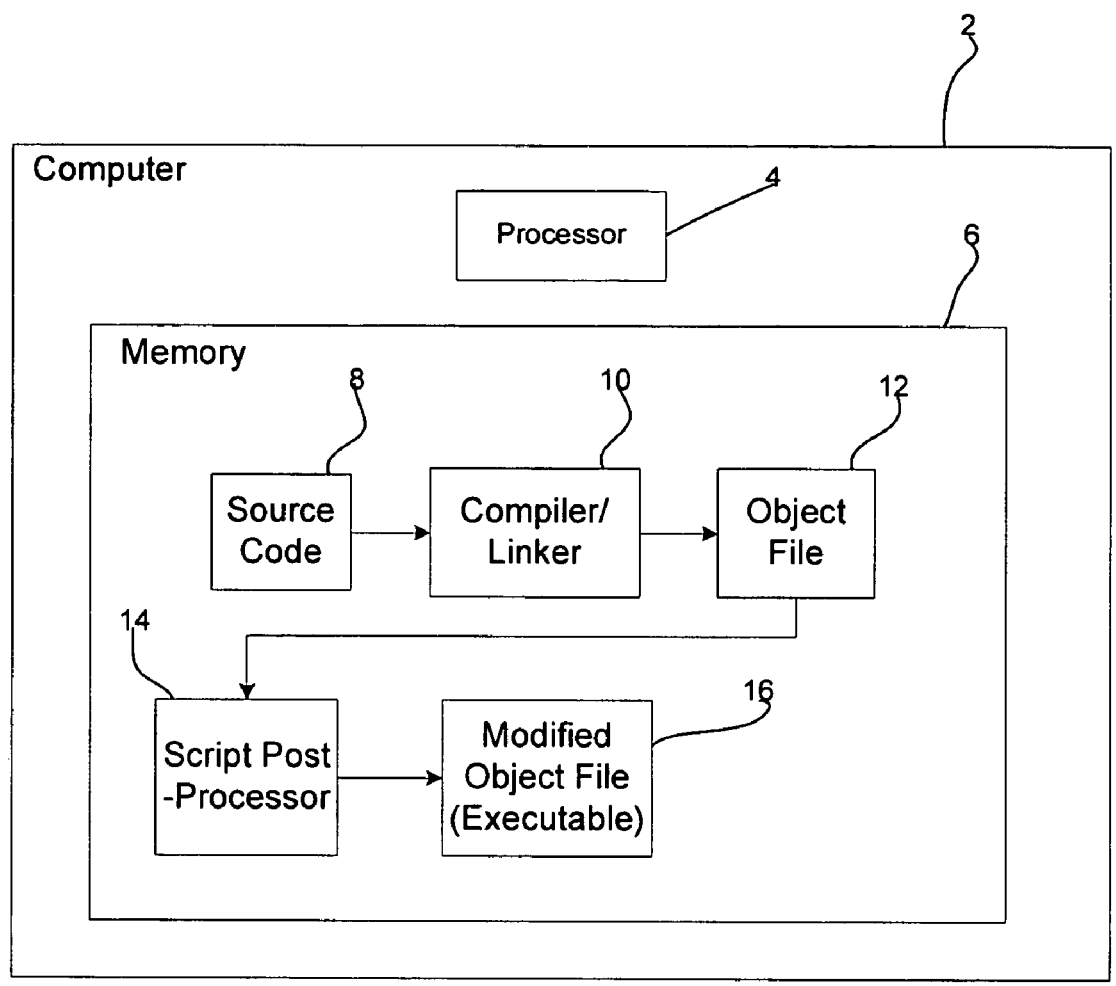
FIG. 1 illustrates an embodiment of a computer and components used to generate an object file.

FIG. 1 illustrates a computing environment used with the described embodiments to develop a modified executable object file capable of providing a service processor information on the location of sections of agent code in memory. A computer 2 includes a processor 4 (such as one or more central processing units (CPU)), and a memory 6 (comprised of one or more memory or storage devices, where virtual memory may reference data in either a memory device or magnetic disk). The memory 6 includes the following files and programs, source code 8 including program statements in a high level language, such as C++, etc., a compiler/linker 10, an object file 12 generated from the compiler linker 10, a script post-processor 14 to process the object file 12 to generate a modified object file 16 comprising the executable program code. The compiler/linker 10 processes the source code 8 and assembles the source code 8 into a single executable program comprising the object file 12. The object file 12 may include relocation sections or tables for the referenced symbols. The modified object file 16 generated by the script post processor 14 includes variables for the start and end of sections of the object file 16 in memory that are specified in the source code 8.

Figure 2:
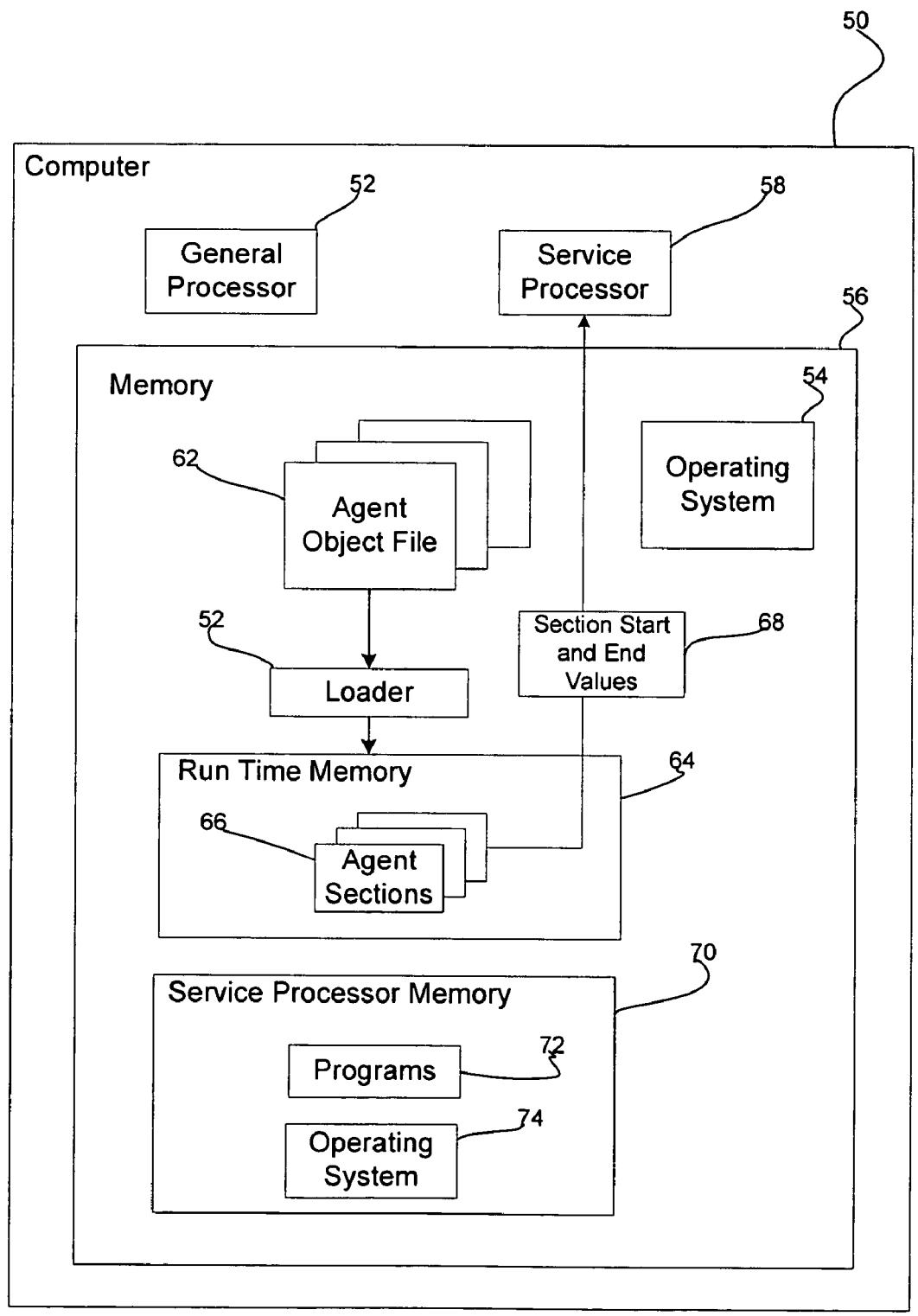
FIG. 2 illustrates an embodiment of a computer in which the object file is loaded.

FIG. 2 illustrates an embodiment of a user computer 50 in which the executable object file 16 is loaded and executed. The user computer 50 includes a general processor 52 that executes an operating system 54 loaded into the memory 56. The user computer 50 also implements a service processor 58 that performs system management operations and operates separately from the general processor 52. For instance, the service processor 58 may execute separate and independently from the operating system 54 executed by the general processor 52. The general 52 and service 58 processors may be implemented in separate processor devices. Alternatively, the general 52 and service 58 processors may comprise virtualized execution partitions or logical partitions implemented on the same processor device(s). Programs executing in the operating system 54 executed by the general processor 52 cannot access or alter operations executed by the service processor 58. The general processor 52 executes an operating system loader 52 that receives agent object files 62, which may comprise modified object files 16, and loads the agent object files 62 into a run time memory 64 in which executable programs run. Agent sections 66 from the agent object files 62 loaded into the run time memory 64 may execute code invoking methods to register with the service processor 58 and provide the service processor 58 start and end memory addresses 68 of one or more sections from an agent object file 62. The memory 56 may further include a service processor memory 70 having programs 72 and an operating system 74 executed by the service processor 58. The service processor memory 70 is inaccessible to the general processor 52. However, in certain embodiments, the service processor 58 may access the general processor 52 runtime memory 64. The service processor memory 70 may be in a separate memory device from the memory device including the run time memory 64. Alternatively, the service processor memory 70 and run time memory 64 share the same memory devices, with access restrictions to the two different memory sections 64 and 70 enforced by memory access/chipset hardware of the general 52 and service 58 processors.

The service processor 58 uses this start and end information to access particular sections loaded into the memory 64. The service processor 58 may perform checking of located agent sections to determine if unauthorized changes have been made to the code.

Figure 3:
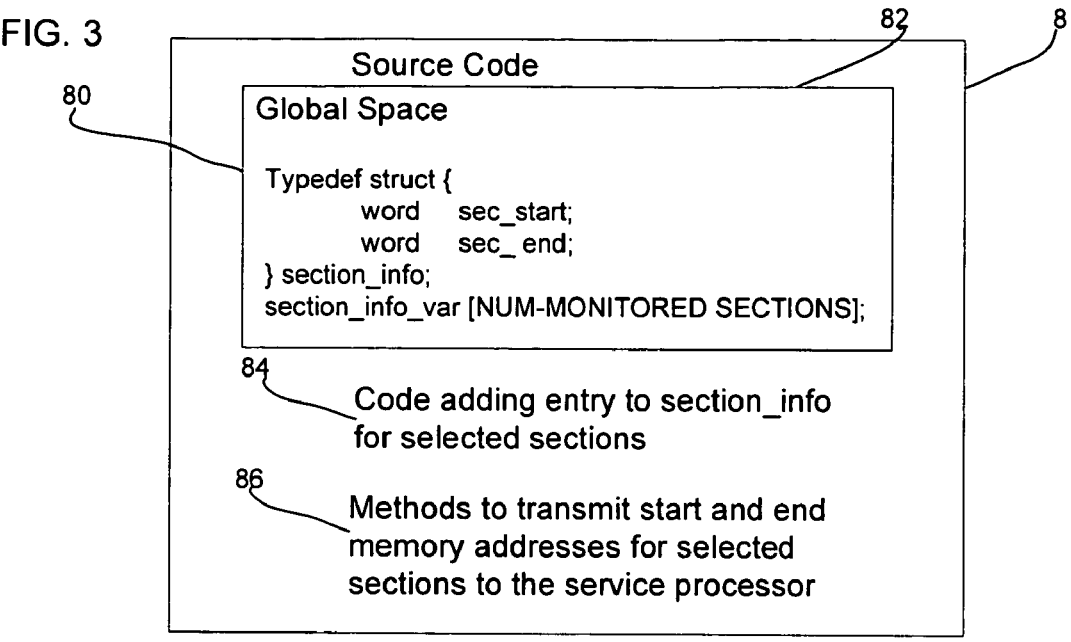
FIG. 3 illustrates an embodiment of source code having statements to provide information on section start and end locations in memory.

FIG. 3 illustrates an embodiment of source code 8 including a definition of an array "section_info_var" 80 defining entries having a start and end variables for the start and end memory address of sections within an object file 12. The array 80 may be defined in a global space 82. The declaration of sec_info_var [NUM_MONITORED_SECTIONS] allocates an array so that the corresponding space gets allocated to the object file 12, such that the array has a number of entries comprising the number of monitored sections. The source code 8 further includes statements 84 adding entries to the array 80 for selected sections to identify the sections for which start and end memory address information will be gathered, which may be presented to the service processor 58. The source code 80 also includes methods 86 to transmit start and end memory addresses in the defined array for selected sections indicated in the source code 8 to the service processor 58 or some other process. In alternative embodiments, the section start and end variables may be defined as part of a data structure other than an array.

Figure 4:
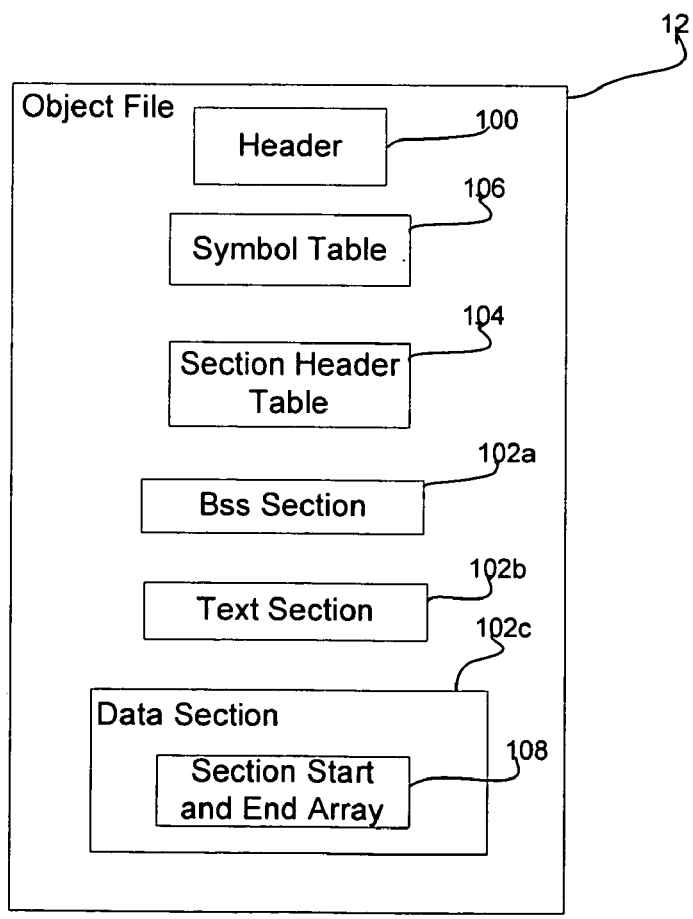
FIG. 4 illustrates an embodiment of an object file including an array of section start and end variables for selected sections.

FIG. 4 illustrates an embodiment of an object file 12 produced by the compiler/linker 10. The object file 12 may include a header 100 providing information on the object file, such as the object file type, required architecture, etc. The header 100 may further include a section header table 104 used to locate all of the object file's 12 sections 102a, 102b, 102c. A section header table 104 comprises an array whose entries provide information on the sections in the object file 104. The sections header table 104 entries may provide the byte offset from the beginning of the file to the first byte in the section 102a, 102b, 102c and the section's size in bytes. A bss section 102a holds uninitialized variables or common storage data. The text section 102b holds executable instructions of the program and the data section 102c holds initialized data. Additional or fewer sections may be included in the object file 12. In certain embodiments, the data section 102c may be alterable. For example, certain object file formats may consolidate relevant bits of information that the object file 12 of the described embodiments delineates separately into a single section, such as by placing data and code into a single contiguous section with run-time interpretive data/code lengths/pointers. However, in certain embodiments, there is one section describing the agent executable code and measured data. The object file 12 further includes a symbol table 106 providing an entry for each variable referenced in the sections 102a, 102b, 102c. The data section 102c may include the section start and end array 108 providing information on the section start and end memory locations of certain selected sections. The exact offset of these variables in the data section 102c may be determined from the symbol table 106 including information on all defined symbols, including the section start and end array 108 variables. The size of each section 102a, 102b, 102c can be determined by values in the section header table 104 entries corresponding to the sections 102a, 102b, 102c. The section addresses maintained in the section related variables may comprise physical addresses or virtual addresses if the service processor 58 is capable of accessing the virtual addressed memory used by the general processor 52.

The object file 12 may include additional and different information than shown in FIG. 4, such as relocation sections providing relocation information on how to modify/resolve references in the sections to various symbols (e.g., internal and external) or functions. The relocation information includes an offset of the location in the section in which to apply the relocation action. Relocation information may indicate the symbol on which the relocation is based and a relocation type providing a code describing how to alter the information being relocated, such as by performing a calculation.

The object file 12 may be implemented in an object file format known in the art, such as the Executable and Linkable Format (ELF) format, described in the document "Tool Interface Standard (TIS) Executable and Linking Format (ELF) Specification, Version 1.2", published by the TIS Committee (1995). Other object file formats include, a.out, Common Object File Format (COFF), Mach Object File Format (Mach-O), and Microsoft Portable Executable format (PE).

Figure 5:
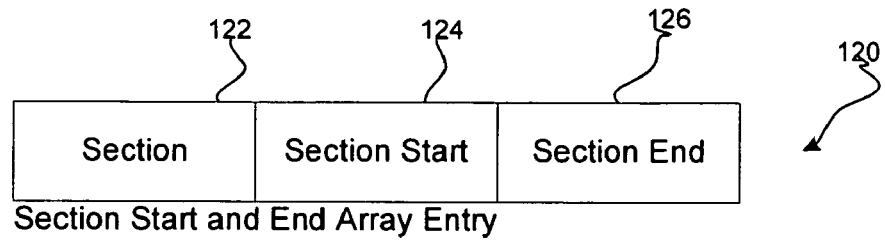
FIG. 5 illustrates an embodiment of an entry in the array providing information on section start and end locations in the memory.

FIG. 5 illustrates an embodiment of information that may be included in an entry added to the section start and end array 108, which includes information identifying the section 122 and the start 124 and end 126 variables having the start and end memory addresses for the identified section 122.

Figure 6:
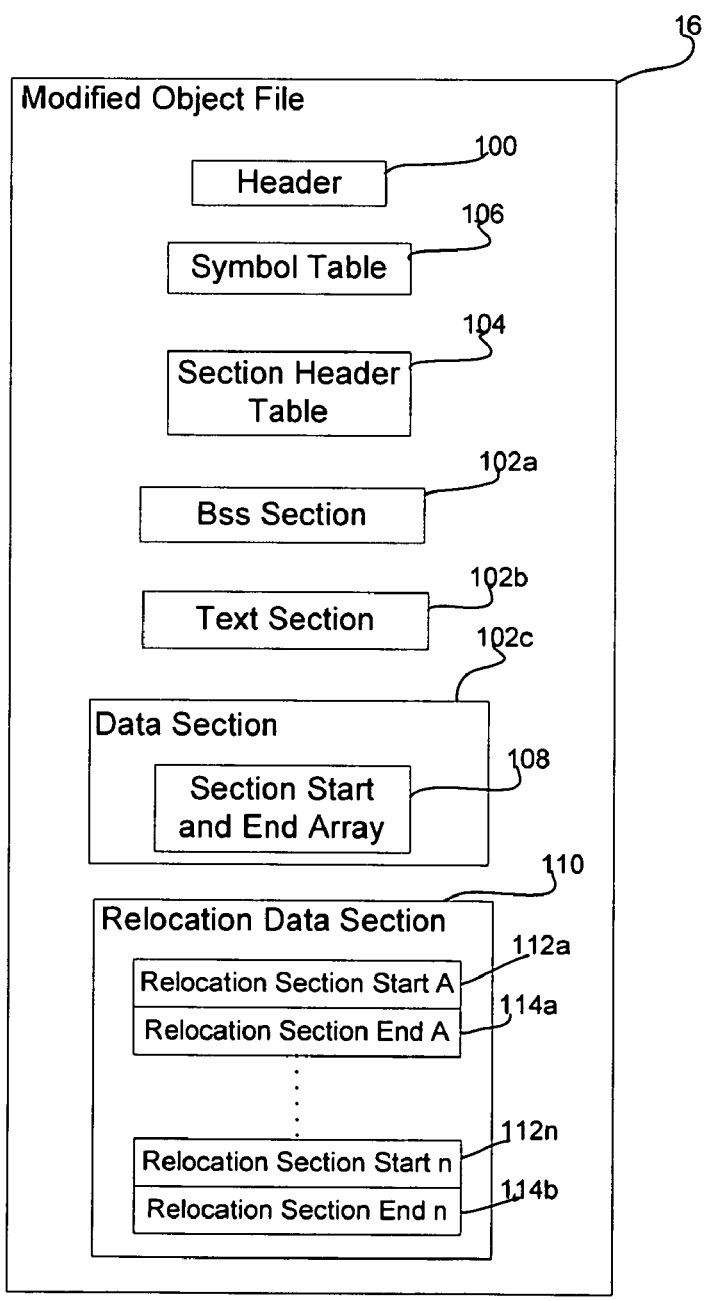
FIG. 6 illustrates an embodiment of a modified object file including relocation entries for the section start and end variables for the selected sections.

FIG. 6 illustrates an embodiment of the modified object file 16, which includes many of the same components as the object file 12. Additionally, the modified object file 16, in its relocation section 110 for the data section 102c, contains relocation entries 112a . . . 112n for the section start addresses and relocation entries 114a . . . 114n for section end addresses for those sections for which this information is maintained. Alternatively, the relocation section 110 for the data section may exist in the unmodified object file 12. These relocation entries 112a . . . 112n, 114a . . . 114n may include the offset in the data section 104c including the section start and end variables and a relocation type, such as the R_386_32 relocation type used in the ELF format. This relocation type specifies that the integer currently at the offset where the section start or end variable is located is added to a symbol indicated in the symbol table 106. For instance, the relocation information may have two sub-fields, the upper 24 bits of this field contain the index in the symbol table 106 with respect to which the relocation is performed, while the lower 8 bits indicate the relocation type.

In one embodiment, the symbol table 106 or section header table 104 may include a variable (symbol) for each section pointing to the start of that section. If the section start variable is initialized to zero, then the relocation type, such as R_386_32, may add the start value of the section indicated in the symbol to the content of the section start value, which is zero, to produce the section start address. The relocation type for the section end variable may specify to add the content of the section start variable, having the start of the section, to the current value in the section end variable, which is the size of the section, resulting in the memory location of the end of the section. In the described embodiments, standard relocation types supported by the operating system 54 may be used to set the section start and end variables to the memory addresses of the start and end of the sections.

In alternative embodiments, the section start and end variables may be initialized to values other than zero and the section size, respectively, and other relocation operations may be performed involving other variables to cause the section start and end memory addresses to be relocated to the section start and end variables during relocation.

Figure 7:
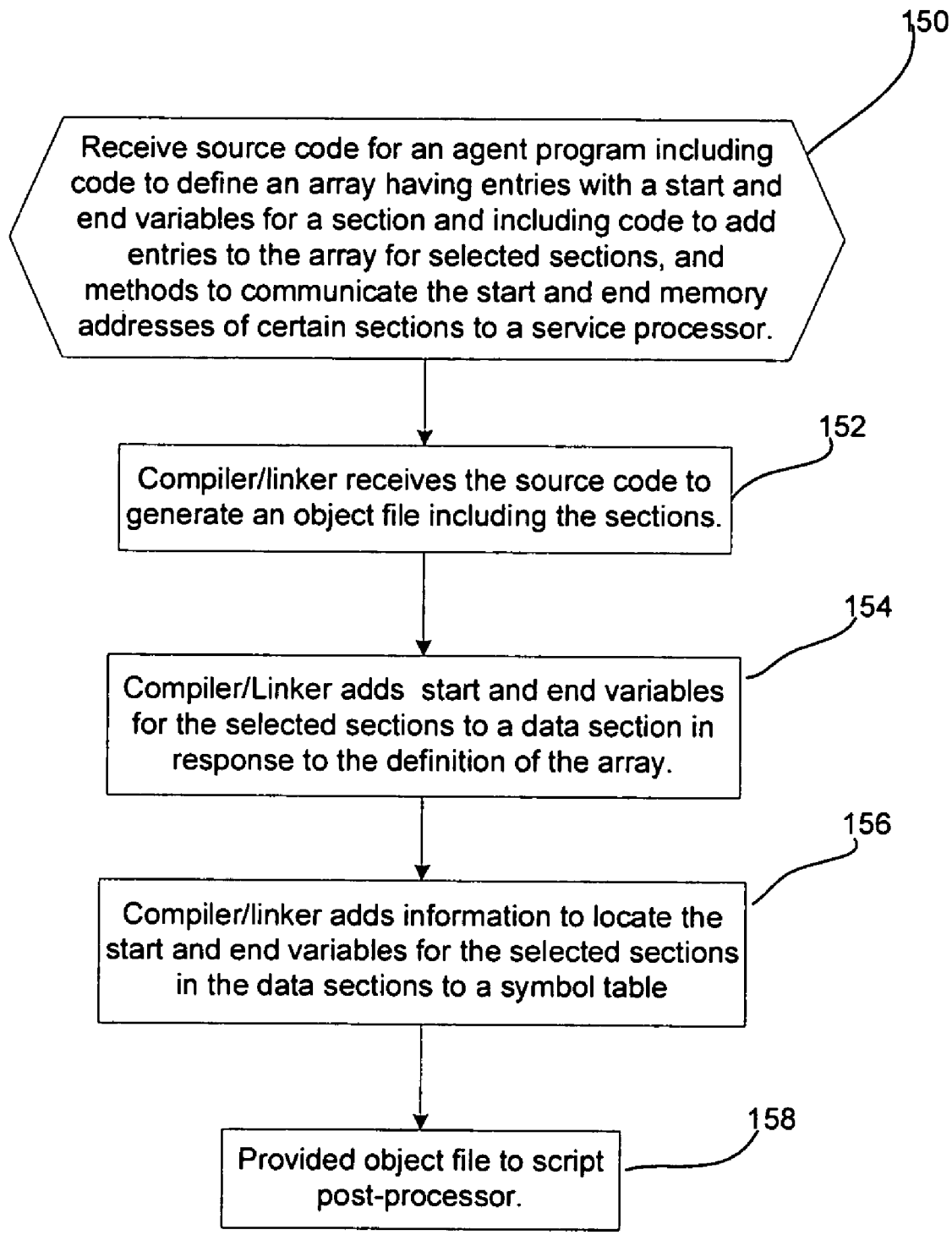
FIG. 7 illustrates an embodiment of operations to generate an object file.

FIG. 7 illustrates operations to generate the object file 12 from the source code 8. At block 150, the compiler/linker 10 receives (at block 150) the source code 8 for an agent program including: code 80 (FIG. 3) to define an array having entries with start and end variables for a section; code 84 to add entries to the array for selected sections; methods 88 to communicate the start and end memory addresses of certain sections to a service processor 58; and other agent related code. The source code 8 may be generated by the agent program developer. The compiler/linker 10 generates (at block 152) an object file 12 from the received source code 8 including sections and other components shown in FIG. 4. The compiler/linker 10 adds (at block 154) start and end variables for the selected sections to the data section 102 in the section start and end array 108 in response to compiling the definition of the array 80. The compiler/linker 10 adds (at block 156)

information to locate the start and end variables for the selected sections in the data section 102c to the symbol table 106. The object file 12 is then provided (at block 158) to the script post-processor 14. The agent program developer may run the compiler/linker 10 and the script post-processor 14 to generate the modified object file 16 to provide to a user to load into the user computer.

Figure 8:
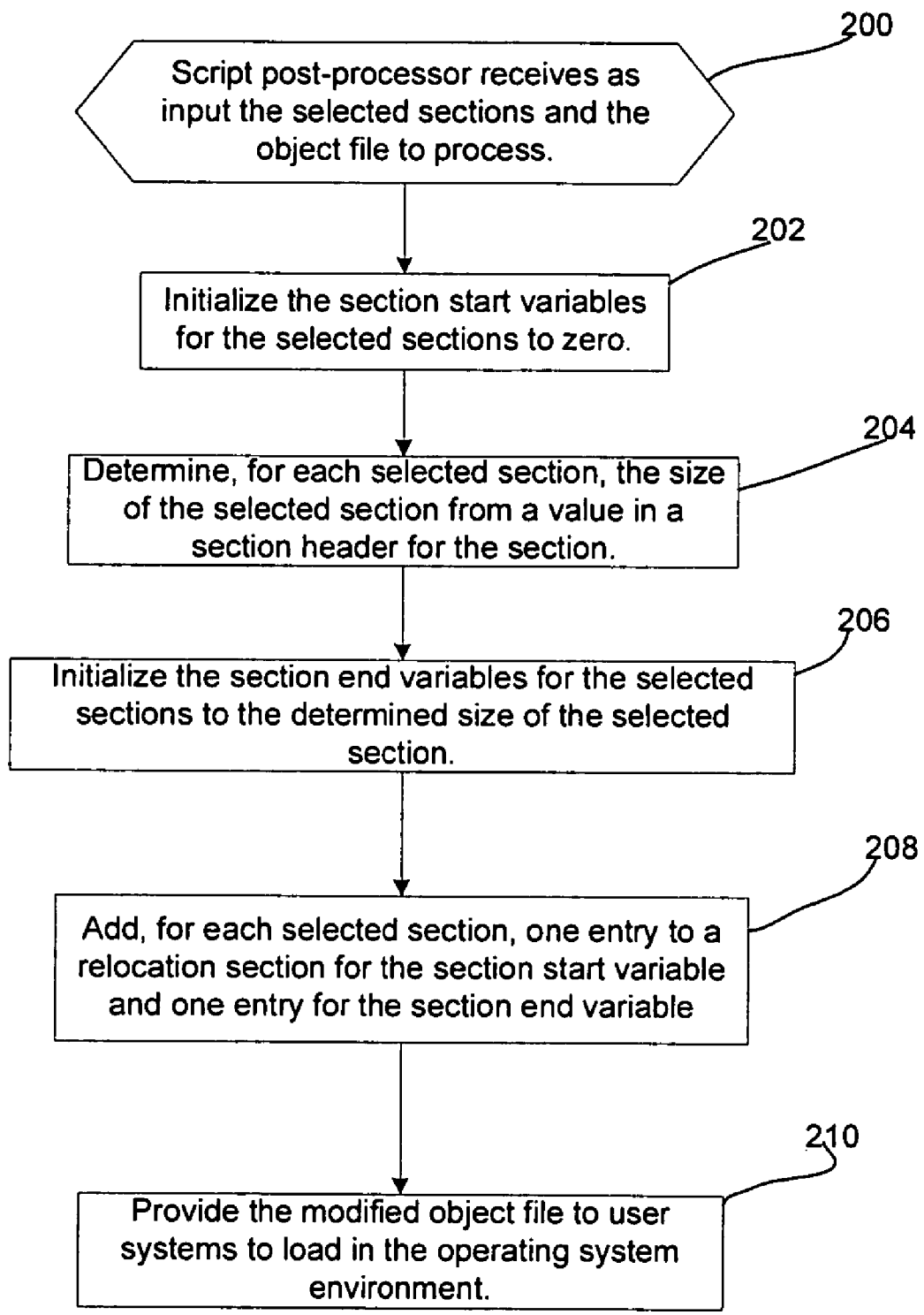
FIG. 8 illustrates an embodiment of operations to modify the object file to include relocation information for the section start and end variables.

FIG. 8 illustrates an embodiment of operations performed by the script post-processor 14 to process the object file 12 to generate the modified object file 16. At block 200, the script post-processor 14 receives as input the selected sections for which section start and end information will be generated and the object file 12 to process. In one embodiment, the start variables for the selected sections are initialized (at block 202) to zero. A determination is made (at block 204) for each selected section of the size of the selected section from a value in the entry in the section header table 104 for the section 102a, 102b, 102c for which the determination is being made. The section size may be maintained in the section header table 104. The script post-processor 14 initializes (at block 206) the section end variables for the selected sections to the determined size of the selected sections. The script post-processor 14 adds (at block 208), for each selected section, one entry 112a . . . 112n (FIG. 6) to a relocation section, such as the relocation data section 110, for the section start variable and one entry 114a . . . 114n for the section end variable. The agent program developer provides (at block 210) the modified object file 16 produced by the script post-processor 14 to user systems 50 (FIG. 2) to load. Thus, the agent code installed on the user computer 50 comprises or is based on the modified object file 16.

Figure 9:
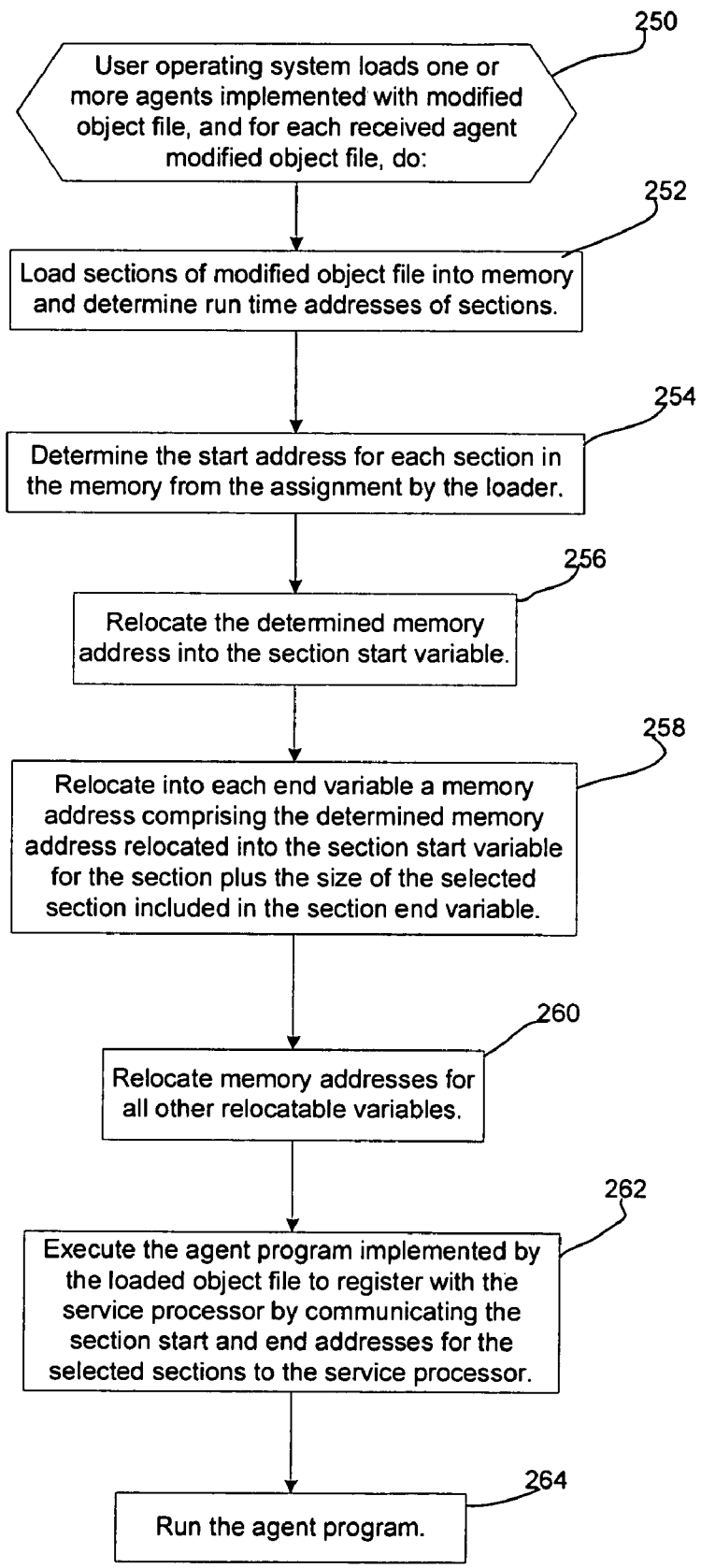
FIG. 9 illustrates an embodiment of operations to load the object file sections into memory and relocate the section start and end memory locations into the section start and end variables in memory.

FIG. 9 illustrates operations performed by the operating system loader 52 to load the agent object file 62, which comprises a modified object file 16, into the run time memory 64 to execute. The operating system loader 52 loads (at block 250) one or more agents implemented with agent object files 62 and relocates memory addresses into relocatable variables by performing the operations at blocks 252-264. The loader 52 loads (at block 252) sections of the modified object file 16 into the run time memory 64 and determines run time memory 64 addresses for the loaded sections, including the Bss 102a, text, 102b, data 102c and other object file sections. The loader 52 determines (at block 254) the start address for each section in the memory 64 from the assignment by the loader 52. This section start address may be maintained in an entry in the section header table 104. For each selected section, the loader 52 relocates (at block 256) the determined memory address into the section start variable in the section start and end array 108. The loader 52 further relocates (at block 258) into each section end variable in the array 108 the section start address from the section start variable added to the size of the selected section already included in the section end variable. As discussed above, this relocation operation is indicated in the relocation type maintained in the relocation entries 112a . . . 112n, 114a . . . 114n. The relocation type specifies operations to add a value for a variable in the symbol table 106 to the value to which the section start or end variable is set and to add this calculated value to the corresponding section start or end variable in the array 108. Any reference to the section start and end variables in the code are then resolved with the value relocated into the section start and end variables in the array 108. In an ELF object file embodiment, the relocation type may comprise the R_386_32 type. The loader 52 relocates (at block 260) memory addresses for all other relocatable variables. The operating system 54 executes (at block 262) the code in the agent sections 66 to register with the service processor 58 by communicating the start and end addresses for the selected sections to the service processor 58. As discussed, the service processor 58 may operate independently and separate from the operating system 56.

With the described embodiments, the agent program developer may add code to the source code to define section start and end variables. After the agent program developer compiles the source code to generate an object file, the agent program developer may further use a script post processor or other program to modify the object file to initialize the section start and end variables and create relocation entries for the section start and end variables. This code added to the object file causes the loader of the user system loading the object file to place the section start and end memory addresses at programmatically accessible locations, so that the agent program may communicate that section start and end information to a separate service processor. The service processor may operate independently of the operating system executing the agent code, and may run a separate special purpose operating system to perform monitoring operations with respect to agent code. The service processor may access agent code using the section start and end information to determine whether the accessed agent code was modified in an unauthorized manner, such as by malicious code.

The described embodiments may use current operating system techniques, such as the recognized relocation types, to provide information on the starting and ending memory addresses of different sections during the loading process. Certain embodiments may not rely on modifying the compilers, linkers and loaders to add any special information to the object file. In this way the described embodiments are compatible with legacy compilers, linkers and loaders. The described embodiments modify the object file to add relocation entries separately from a legacy compiler, linker and loader, and may then invoke the legacy loader to load the object file and relocate the memory addresses to the section start and end variables during relocation operations. In alternative embodiments, the described script post-processor 14 operations may be integrated with the compiler, linker and/or loader code.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The computer readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiment, the information on the start and end locations of certain sections in the memory are communicated to a service processor executing independently of the operating system executing the sections. In an alternative embodiment, the section start and end information may be used by processes within the operating system other than the described service processor.

In a yet further embodiment, instead of adding the sec_start and sec_end variables to the source code 8, the compiler/linker 10 could be modified to add them directly to the object file, without any special provisions in the source code. In a further embodiment, the relocation entries may not be added by the script post-processor 14, but instead could be added using macros and other programming techniques in the source code 8. For example, adding a statement such as var=main may create an additional relocation entry, that could be used by the script post processor 14.

In the described embodiments, the script post-processor 14 comprised a separate program. In an alternative embodiment, the script post-processor 14 may be part of the compiler linker 10 or incorporated into the operating system loader 52.

In described embodiments, values for the section start and end memory addresses are relocated into section start and end variables. In an alternative embodiment, one of the section start and end variables may not be relocated, and the service processor 58 or some other process can figure out the correct value of a section start or end memory location based on the content of the other start or end variable and the section size, which may be maintained in the section header of the loaded code.

In an alternative embodiment, entirely different relocation operations, identified by other relocation types, may be used to relocate the section start and end memory addresses into the corresponding variables.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or that a different number of devices may be used than the multiple number shown.

The functionality and/or the features of a device may be alternatively embodied by one or more other devices which are not explicitly described as having such functionality/features. Thus, other embodiments of the present invention need not include the device itself.

The illustrated operations of FIGS. 7, 8, and 9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
generating source code in a computer readable storage medium for an agent program, wherein the source code includes start and end variables for selected sections of the program, wherein the start and end variables for each selected section are used to indicate the start and end address in a memory of a computer at which the section is loaded, and wherein the selected sections are capable of including less than all the sections in the program; and
compiling and linking the source code to generate an object file in the computer readable storage medium including the sections, wherein the object file is executed by the computer to perform, in response to being loaded into the memory of the computer, a relocating of at least one of the start and end memory addresses of the selected sections into at least one of the start and end variables for the selected sections when memory addresses are assigned to sections during the relocating.

2. The method of claim 1, wherein the source code includes methods having parameters including the start and end variables for the selected sections to transfer information on the start and end memory addresses of the selected sections to a service processor.

3. The method of claim 1, wherein start and end variables for the selected sections are declared as an array in a global section of the source code.

4. The method of claim 1, further comprising:
adding the start and end variables for the selected sections to a data section of the object file as part of generating the object file;
adding information to locate the start and end variables for the selected sections in the data sections to a symbol table of the object file;
initializing the start variables for the selected sections to zero; and setting the end variables for the selected sections to a size of the selected section.

5. The method of claim 4, further comprising:
adding, for each selected section, one entry to a relocation table for the start variable and one entry for the end variable; and
determining, for each section start entry in the relocation table, the memory address of the start of the section for the section start variable, wherein the relocating operations caused when the object file is loaded into the memory further comprise relocating, for each section start entry, the determined memory address into the section start variable and relocating into each end variable a memory address comprising the determined memory address relocated into the section start plus the size of the selected section included in the end variable.

6. The method of claim 5, wherein the operations of initializing the start and end variables for the selected sections and adding, for each selected section, one entry to the relocation table prior to the relocation operation are performed by a script program that processes the object file after the compiling of the object file.

7. The method of claim 6, wherein the operation of adding, for each selected section, one entry to the relocation table is performed by using a programming technique to add the relocation table entries to the source code.

8. A system, comprising:
a processor;
a memory including addressable locations;
a storage device including an object file for an agent program, wherein the object file defines start and end variables for selected sections of the program, wherein the start and end variables for each selected section are used to indicate the start and end address in the memory at which the section is loaded, and wherein the selected sections are capable of including less than all the sections in the program;
a computer readable medium including code executed by the processor to perform operations comprising:
loading the object file into the memory; and
relocating, in response to loading the object file, at least one of the start and end memory addresses of the selected sections into at least one of the start and end variables for the selected sections when memory addresses are assigned to sections as part of relocation operations.

9. The system of claim 8, wherein the object file includes methods having parameters including the start and end variables for the selected sections, wherein the processor comprises a first processor, and further comprising:
a second processor; and
an operating system executed by the first processor to execute the object file and perform the relocation operations, wherein the first processor further executes the methods in the object file to transfer information on the start and end memory addresses of the selected sections to the second processor, and wherein the second processor operates independently and separately from the operating system.

10. The system of claim 8, wherein for each selected section, there is on entry in a relocation table for the start variable and one entry for the end variable, and wherein the processor executes the object file to perform:
determining, for each section start entry in the relocation table, the memory address of the start of the section for the section start variable;
relocating, for each section start entry, the determined memory address into the section start variable; and
relocating into each end variable a memory address comprising the determined memory address relocated into the section start plus the size of the selected section included in the end variable.

11. An article of manufacture including code in a computer readable storage medium executed by a processor to perform operations to generate an object file in the computer readable storage medium that is loaded into a memory in a computer for execution, the operations comprising:
accessing source code in the computer readable storage medium for an agent program, wherein the source code includes start and end variables for selected sections of the program, wherein the start and end variables for each selected section are used to indicate the start and end address in a memory at which the section is loaded, and wherein the selected sections are capable of including less than all the sections in the program; and
compiling and linking the source code to generate an object file in the computer readable storage medium including the sections, wherein the object file is executed by the computer to perform, in response to being loaded into the memory of the computer, a relocating of at least one of the start and end memory addresses of the selected sections into at least one of the start and end variables for the selected sections when memory addresses are assigned to sections as part of the relocating.

12. The article of manufacture of claim 11, wherein the source code includes methods having parameters including the start and end variables for the selected sections to transfer information on the start and end memory addresses of the selected sections to a service processor, wherein the object file loaded into the memory is executed by an operating system and wherein the service processor operates independently and separately from the operating system.

13. The article of manufacture of claim 11, wherein start and end variables for the selected sections are declared as an array in a global section of the source code.

14. The article of manufacture of claim 11, wherein the operations further comprise:
adding the start and end variables for the selected sections to a data section of the object file as part of generating the object file;
adding information to locate the start and end variables for the selected sections in the data sections to a symbol table of the object file;
initializing the start variables for the selected sections to zero; and setting the end variables for the selected sections to a size of the selected section.

15. The article of manufacture of claim 14, wherein the operations further comprise:

determining, for each selected section, the size of the selected section from a value in a section header for the section, wherein the determined size comprises the size to which the section end variable is set.

16. The article of manufacture of claim 14, wherein the operations further comprise:
adding, for each selected section, one entry to a relocation table for the start variable and one entry for the end variable; and
determining, for each section start entry in the relocation table, the memory address of the start of the section for the section start variable, wherein the relocating operations caused when the object file is loaded into the memory further comprise relocating, for each section start entry, the determined memory address into the section start variable and relocating into each end variable a memory address comprising the determined memory address relocated into the section start plus the size of the selected section included in the end variable.

17. The article of manufacture of claim 16, wherein the operation of adding, for each selected section, one entry to the relocation table is performed by using a programming technique to add the relocation table entries to the source code.

18. An article of manufacture including code in a computer readable storage medium executed by a processor used by a developer of an agent program to generate an object file in the computer readable storage medium that is loaded into a memory in a computer for execution, the operations performed by the processor executing the code comprising:
modifying an object file in the computer readable storage medium compiled and linked from source code in the computer readable storage medium for the agent program, wherein the source code includes start and end variables for selected sections of the program, wherein the start and end variables for each selected section are used to indicate the start and end address in a memory at which the section is loaded, and wherein the selected sections are capable of including less than all the sections in the program, and wherein the processor modifies the object file, wherein the modified object file is executed by the computer to perform, in response to being loaded into the memory of the computer, a relocating of at least one of the start and end memory addresses of the selected sections into at least one of the start and end variables for the selected sections when memory addresses are assigned to sections as part of the relocating.

19. The article of manufacture of claim 18, wherein the source code includes methods having parameters including the start and end variables for the selected sections to transfer information on the start and end memory addresses of the selected sections to a service processor.

20. The article of manufacture of claim 18, wherein modifying the object file further comprises:
adding the start and end variables for the selected sections to a data section of the object file as part of generating the object file;
adding information to locate the start and end variables for the selected sections in the data sections to a symbol table of the object file;
initializing the start variables for the selected sections to zero; and
setting the end variables for the selected sections to a size of the selected section.

21. The article of manufacture of claim 20, wherein modifying the object file further comprises:
determining, for each selected section, the size of the selected section from a value in a section header for the section, wherein the determined size comprises the size to which the section end variable is set.

22. The article of manufacture of claim 18, wherein modifying the object file further comprises:
adding, for each selected section, one entry to a relocation table for the start variable and one entry for the end variable; and
determining, for each section start entry in the relocation table, the memory address of the start of the section for the section start variable, wherein the relocating operations caused when the object file is loaded into the memory further comprise relocating, for each section start entry, the determined memory address into the section start variable and relocating into each end variable a memory address comprising the determined memory address relocated into the section start plus the size of the selected section included in the end variable.

23. The article of manufacture of claim 22, wherein the operations of initializing the start and end variables for the selected sections and adding, for each selected section, one entry to the relocation table prior to the relocation operation are performed by a script program that processes the object file after the compiling of the object file.

24. The article of manufacture of claim 23, wherein the operation of adding, for each selected section, one entry to the relocation table is performed by using a programming technique to add the relocation table entries to the source code.

25. The article of manufacture of claim 22, wherein the code is integrated in a compiler program, and wherein the operations of initializing the start and end variables for the selected sections and adding, for each selected section, one entry to the relocation table prior to the relocation operation are performed by the compiler program.

* * * * *